(12) United States Patent
Fontenille

(10) Patent No.: US 6,551,637 B1
(45) Date of Patent: Apr. 22, 2003

(54) METHOD OF MAKING COMPOSITE PRODUCT BASED ON CHEESE

(75) Inventor: Hélène Fontenille, Macornay (FR)

(73) Assignee: Fromageries Bel, Paris (FR)

( * ) Notice: Subject to any disclaimer, the term of this patent is extended or adjusted under 35 U.S.C. 154(b) by 0 days.

(21) Appl. No.: 09/700,553

(22) PCT Filed: May 11, 1999

(86) PCT No.: PCT/FR99/01122

§ 371 (c)(1),
(2), (4) Date: Nov. 16, 2000

(87) PCT Pub. No.: WO99/59420

PCT Pub. Date: Nov. 25, 1999

(30) Foreign Application Priority Data

May 18, 1998 (FR) .............................. 98 06256

(51) Int. Cl.⁷ .................................. A23P 1/00
(52) U.S. Cl. .................... 426/89; 426/130; 426/580; 426/582
(58) Field of Search .................. 426/582, 89, 106, 426/130, 580, 392

(56) References Cited

U.S. PATENT DOCUMENTS

| 1,721,406 A | | 7/1929 | Parsons |
| 5,194,283 A | * | 3/1993 | Dupas et al. ............... 426/582 |
| 5,792,500 A | * | 8/1998 | Housset et al. ............. 426/582 |

FOREIGN PATENT DOCUMENTS

| DE | 296 20 117 | 3/1997 |
| EP | 0 128 963 | 12/1984 |
| EP | 0 260 194 | 3/1988 |
| FR | 728.807 | 7/1932 |
| FR | 2 386 235 | 10/1978 |
| FR | 2 411 539 | 7/1979 |
| FR | 2 650 484 | 2/1991 |
| GB | 990068 | 4/1965 |

* cited by examiner

*Primary Examiner*—Leslie Wong
(74) *Attorney, Agent, or Firm*—Young & Thompson

(57) ABSTRACT

The invention concerns a composite product based on cheese having an outer envelope and an internal filling completely enclosed in the outer envelope, at least said outer envelope being obtained from processed cheese with creaming property.

7 Claims, 4 Drawing Sheets

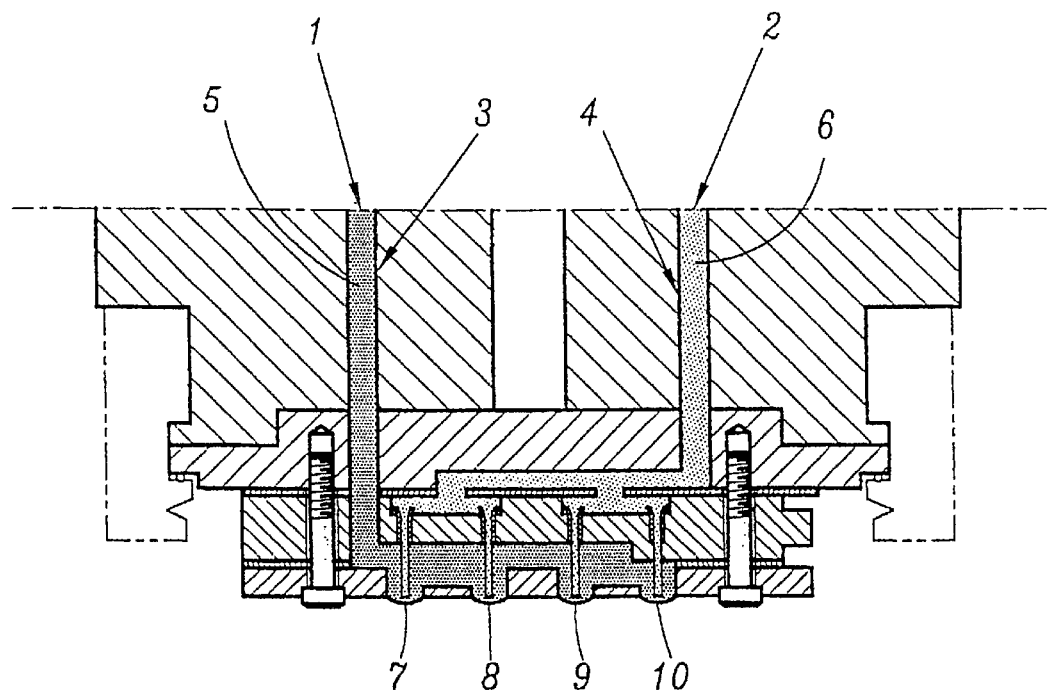
FIG. 1
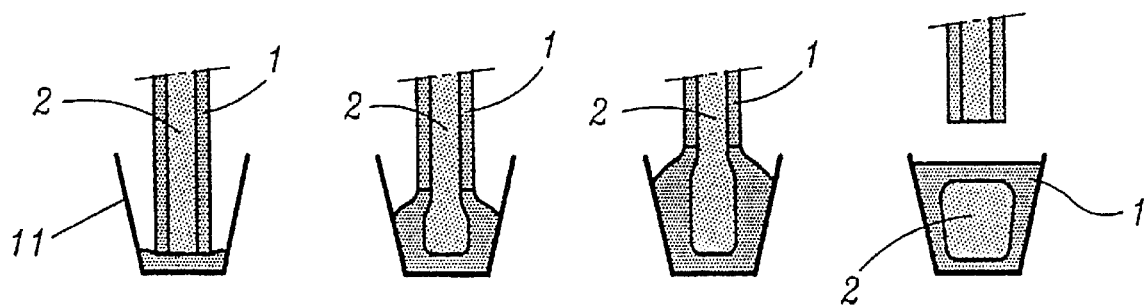
FIG. 2A  FIG. 2B  FIG. 2C  FIG. 2D

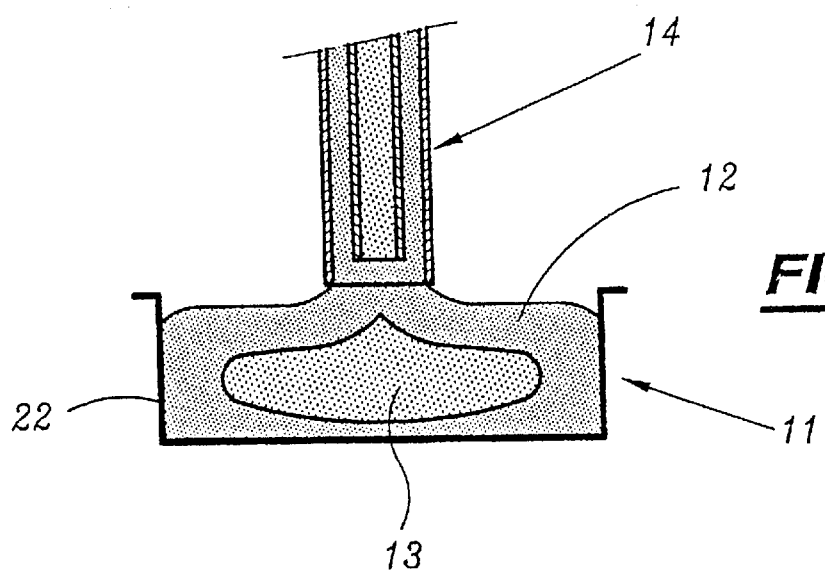
FIG.5A
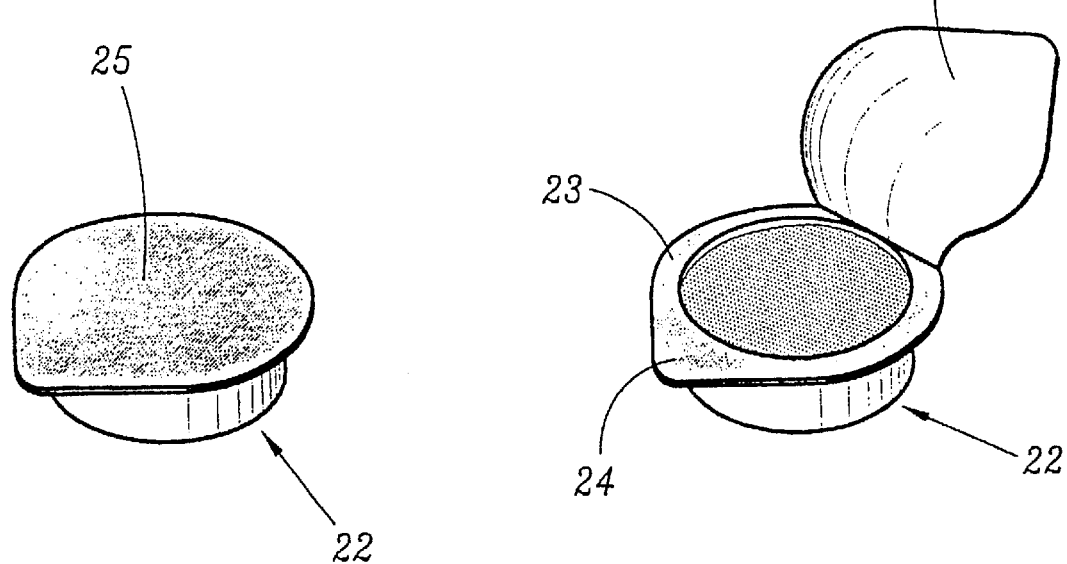
FIG.5B  FIG.5C

METHOD OF MAKING COMPOSITE PRODUCT BASED ON CHEESE

This application is a national stage filing of PCT/FR99/01122 filed May 11, 1999.

The present invention relates to the cheese industry. It relates more particularly to composite cheese products comprising an external cheese paste also designated external shell and an internal filling having identical or different texture, the external cheese paste being composed of processed cheese.

It also relates to a process for the manufacture of such products.

Food products are known which comprise cheese pastes combined with other cheeses or cheese specialities or other food products.

In general, in the case of the combination of cheese pastes, distinct blocks of cheese are caused to adhere to each other or they are filled with different pastes by means of a binding agent used in the food industries.

There may be mentioned, by way of example, patents FR 2,411,539, FR 2,475,301 and FR 2,504,781 which describe cheeses made in several distinct and successive steps, formed of several layers of processed pastes.

In general, the external paste is a processed homogeneous paste which makes it possible to provide good mechanical strength to the finished product, and the manufacturing technique is that for a processed cheese.

The documents EP-A-102 232, EP-A-130 740 and EP-A-130 772 describe extrusion techniques which make it possible to produce marbled food products or food products comprising an external paste surrounding an internal paste.

However, the latter techniques which have been used are suitable for confectionery or for products based on flour and are not appropriate for cheese.

There is known, in addition, from the document EP-A-260 194, a process for the manufacture of composite products formed from a cheese paste forming a shell having a texture similar to that of the original product and of a second product forming a filling and enclosed in the shell.

This process comprises a first step of adding proteins to the cheese as well as a subsequent step of mechanically treating and of shaping the treated product. This process is however limited in its implementation, on the one hand, by the raw material used, which is a ripened pressed cheese having a dry extract (DE) of at least 50% and, on the other hand, by two distinct implementation steps.

There is also known from the document EP-A-358 983 a process for producing a composite cheese of which the outside consists of an acid or rennet drained fresh curd and the core consists of a fromage frais of a different nature to the coating so as to create a contrast in texture; the process used for producing this product is co-extrusion.

Furthermore, the document EP-A-727 138 describes the production, by co-extrusion, of a composite cheese product of which the outside is made by mixing, texturing and cooking the fresh curd and the core is made of cheese or another food product, so as to create a contrast in texture.

The document DE-A-128 963 indeed describes the production of composite cheeses comprising separate alternate layers, based on processed cheese, by a technique of metering in the hot state, the production of these products being carried out in several stages using an intermediate mold with walls which allow the different pastes to be delimited at the time of casting and the gelled product then being transferred into its final packaging. However, this process relates to products formed of several pastes in the form of separate layers or bands which are all based on processed cheese.

Moreover, the applicant has already described in patent FR 2,650,484 the production of a cheese-based composite product comprising a firm external shell and an internal paste having a softer consistency according to the so-called "one-shot" technique which consists in co-metering and co-molding two constituents which produce the shell and the filling respectively.

In this document, the external shell is made from a noncoagulated milk concentrate but which comprises a coagulating agent (rennet, acidifying agent) and it is at the co-molding time that the forming into a mass or gelling of the external shell occurs.

Thus, the process described makes it possible to obtain cheese shells from milk protein concentrates and not from processed cheese and the co-metering and co-molding are performed at low temperature (30 to 50° C.).

In general, the processes used in the techniques cited above are either the successive casting, in the hot state, of different processed pastes in order to obtain superposed layers consisting of different products, or the co-extrusion which makes it possible to obtain products comprising a coating and a core of a different texture and/or nature. To date, the latter technique, which makes it possible to obtain products with coating and filling, is only performed on cold products. Indeed, co-extrusion on hot products has never been described or performed.

Moreover, the technique described does not make it possible, because of its characteristics (shearing), to obtain a coating in the form of a homogeneous and continuous gel. Indeed, its application to already gelled products would have the consequence of destroying the gel which would as a result no longer be continuous.

To date, no cheese product of the type comprising an external shell consisting of a homogeneous and continuous processed cheese gel and an internal filling consisting of processed cheese and optionally other food products, is consequently known.

The objective of the invention is to satisfy this demand. For that, a process for co-metering of the constituents, in the hot state, that is to say above the gelling temperature of the proteins, is used, followed by a static cooling which allows continuous gelling.

A second objective of the present invention is to provide a cheese-based composite product of the type comprising an external shell and an internal filling which is completely enclosed in the external shell, at least the external shell being based on a processed cheese.

Another objective of the present invention also relates to the process for the manufacture of a composite cheese of the abovementioned type.

The aim of the present invention was achieved by adapting the co-metering and co-molding technique described in FR-A-2,650,484 to a processed cheese paste for the production of the external shell, and by taking advantage of the specific properties of processed cheeses, in particular their creaming capacity which allows the passage from the sol state to the gel state.

The subject of the invention is thus a composite cheese product of the type comprising an external shell and an internal filling which is completely enclosed in the external shell, at least said external shell being obtained from a processed cheese with creaming capacity.

In the invention, the term "processed cheese" or "processed cheese paste" designates the product obtained by the processing, in the hot state, in the presence or otherwise of emulsifying salts, of cheeses and/or of other dairy products (butter, cream, milk powder, whey), or even of proteins and of fat of plant origin. Other additives (gelling agents, thickeners) may also be present in the formula.

The expression creaming capacity is understood to mean the property of processed cheeses to thicken under the action of the double phenomenon of:

peptization of the proteins allowing the hydration of the chains and resulting in the swelling of the medium and in the increase in viscosity; and insertion of the Ca pyrophosphates formed during the heat treatment between the protein chains in order to form inter- and intraprotein ionic bonds causing the gelling of the network (Le fromage, A. Eck, J. C. Oillis, Ed. Lavoisier, Technique et documentation, 1997).

The filling may consist of a processed cheese paste or the like or of a food product of a different nature, in particular a puree.

Advantageously, the external shell and the internal filling are produced by co-metering and co-molding, in the hot state, of the processed cheese paste forming the external shell and of the food product forming the filling, the temperature used during these stages being greater than the gelling temperature of the processed cheese constituting the external shell.

The subject of the invention is therefore also a process for the manufacture of a cheese-based composite product of the type comprising an external shell and an internal filling completely enclosed in the external shell, and at least the said external shell being obtained from a processed cheese having creaming capacity, the process being characterized in that the co-metering of the constituents forming respectively the external shell and the filling is carried out in the hot state and in that said constituents are simultaneously introduced into a mold where they are cooled at least to a temperature of less than the gelling temperature of the processed cheese paste constituting the external shell.

Thus, the implementation of the process of the invention is based on the use of the specific properties of processed cheese, in particular its capacity to "cream" allowing the passage from the SOL state to a GEL state.

The passage from the SOL state to the GEL state is performed during the cooling to a temperature of less than 50° C. This cooling is performed in a static state, which makes it possible to obtain a continuous gel. It is carried out after metering into the packaging and shaping of the product.

In the context of the present invention, this change of state is desired for the formation of the external coating, but it will be optional for the central filling, in particular in the case where a "flowing" core of processed cheese is desired.

One of the essential characteristics of the invention is the carrying out of the co-metering in the hot state, which has two advantages:

1) The cheese is metered at a temperature greater than the gelling temperature of the proteins, that is to say when the product is in the SOL state, and it is during the cooling that it is converted to a GEL which fixes the shape; the metering temperature, which is greater than the gelling point of the products will be greater than 70° C. and preferably between 70 and 90° C.

2) The high temperature makes it possible to decontaminate the product and thus ensure good hygiene qualities and longer preservation.

The invention will be understood more clearly from the description which follows:

A processed cheese paste and a product intended to form the internal filling consisting of cheese or otherwise, are used as starting material, the constituents having a similar viscosity during the co-metering and the introduction into the mold. Thus, the constituent which forms the core or internal cheese may be processed cheese, processed fromage frais, fromage frais or alternatively food pastes of the puree type having, at the time of co-metering and introducing into the mold, a viscosity close to that of the processed cheese intended to form the external shell.

The expression similar viscosities is understood to mean that the components forming the external shell and filling have, during the simultaneous step of co-metering and introducing into the mold, a difference in viscosity of less than 30 poises (3 Pa·s) under a shear of 150 s$^{-1}$.

This condition of similarity of the viscosity of the two pastes is particularly important at the time of introducing the two pastes into the mold in order to obtain a final product with two very distinct and non-mixed components.

At the time of the co-metering and introducing into the mold, the apparent viscosity of the two components is advantageously between 5 and 50 poises (0.5 to 5 Pa·s) measured at 80° C. under a shear of 150 s$^{-1}$.

Indeed, the apparent viscosity should not be too low because at this viscosity, the pastes would be too fluid and would mix with each other at the time of introducing into the mold; neither should it be too high because, in this case, the pastes would have a firmness which will be hardly compatible with the process of co-metering and introducing into the mold used simultaneously.

Moreover, at the time of the metering, the pastes advantageously have similar pH values. The pH of these two products is preferably between 5.0 and 5.8, acidic pH values (pH<4.5) not being highly desirable because of the destabilization of the product which would result therefrom.

The expression "similar pH values" is understood to mean a difference in pH which is not greater than 0.5 units, at the temperature for co-metering and introducing the constituents into the mold.

In addition, the pastes advantageously have similar dry extracts.

The expression "similar dry extracts" is understood to mean a difference not greater than 5% by weight.

This closeness of pH as well as that of dry extract are also important for the shape and the organoleptic qualities of the product to be well maintained during the preservation of the product.

The co-metering of the constituents is carried out at a temperature preferably of between 70 and 90° C.

The appended figures illustrate the implementation of the process of the invention. For more details, reference may be made to the description and to the figures in the above cited French patent FR-A-2,650,484.

BRIEF DESCRIPTION OF THE DRAWINGS

To facilitate understanding of the text, the installation used is however represented in the appended FIGS. 1 and 2A to 2D, in which:

FIG. 1 is a cross section of the installation used for carrying out the process of the invention;

FIGS. 2A to 2D schematically represent the steps of the process of co-molding of the processed cheese and of the paste forming the internal filling.

In addition, the following FIGS. 3 to 5 represent diagrams of casting heads and of products obtained according to the invention.

Thus.

FIG. 5A represents, in longitudinal section, tubes for metering a cheese portion into its packaging in the form of a dish, FIG. 5B representing, in perspective, the dish provided with a lid and FIG. 5C the same dish containing the product according to the invention after opening the lid.

FIG. 1 is a view of the installation used for carrying out the process in which the final product is shaped in a single operation according to the so-called "one shot" technique. This process consists in simultaneous co-metering and co-molding of the two constituents which will produce respectively the shell and the filling and which may represent a very different taste, texture and consistency.

Figure 3A:
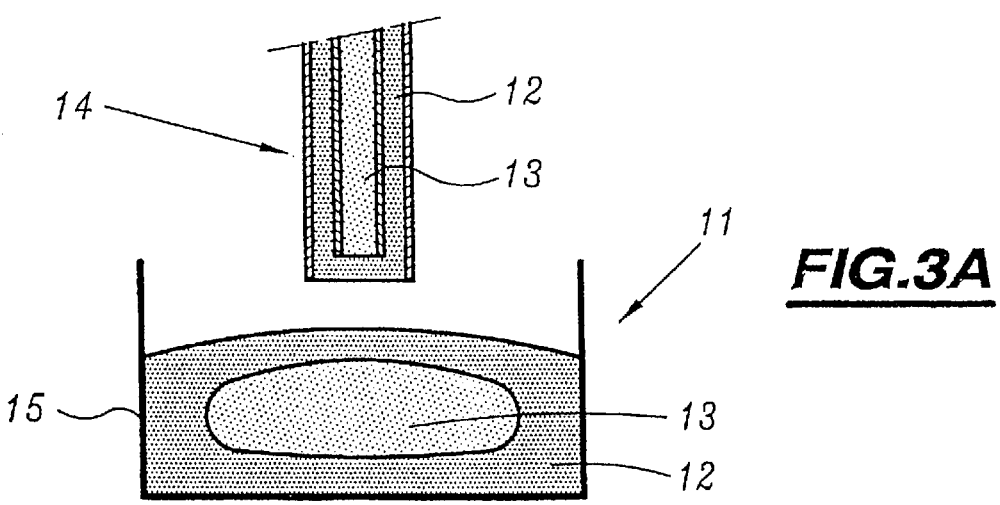
FIG. 3A is a longitudinal sectional view of the tubes for metering a cheese portion and of the latter received in its final packaging, represented at the end of casting.
Figure 3B:
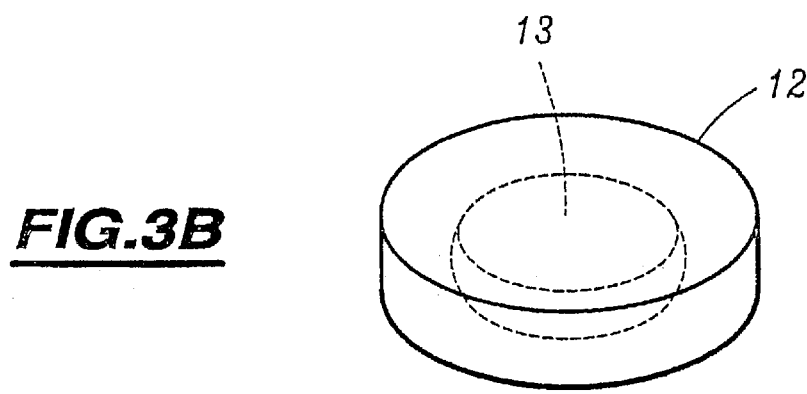
FIGS. 3B, 3C and 3D representing, in perspective, products whose shape is appropriate for this type of packaging.
Figure 3C:
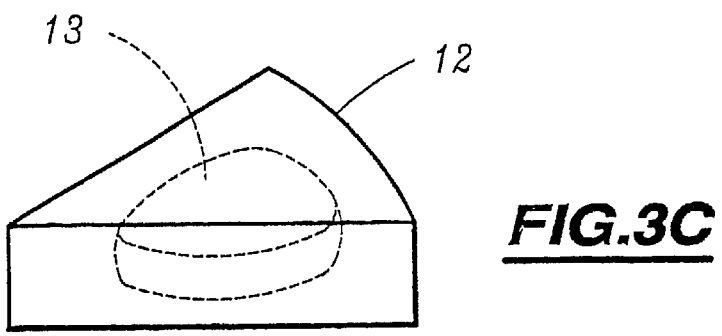
Figure 3D:
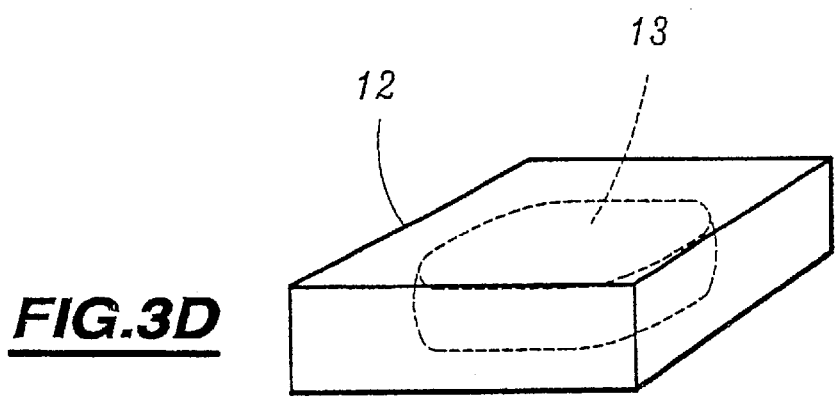

For that, the constituent 1 forming the cheese paste intended to produce the external coating and the internal constituent 2 advantageously in paste form are sent into different hoppers, not represented in the figure, at the bottom of which nozzles 3 and 4 are attached. The flow into the nozzles is controlled by two pistons (one for each product), not represented in the figure, which make it possible to adjust, in a synchronized manner, the quantity of product delivered during each co-metering operation.

The nozzle 3 receives the paste 1, whereas the nozzle 4 receives the paste 2. The constituents are then brought respectively by means of the conduits 5 and 6 to the four parallel metering tubes 7, 8, 9 and 10, under which shaping molds can be placed.

The pistons then send the two constituents into the shaping receptacles 11 where the co-metering is performed as illustrated in FIGS. 2A to 2D.

In a first step (2A), the process starts by casting the paste 1 constituting the shell until a layer of paste is present at the bottom of the receptacle, whose thickness corresponds to the thickness of the desired shell, in steps 2B and 2C, while maintaining the flow of the paste 1, the constituent of the internal paste 2 takes its place in the receptacle for a period corresponding to the quantity of filling desired;

then, in step 2D, the process ends with an external paste layer.

The metered product is cooled to a temperature of less than 50° C. so to obtain gelling of the external paste, which allows a firm shell to be obtained around the filling.

Depending on the shape of the receptacle and the texture, taste and consistency characteristics of the two constituents, a wide range of novel and innovative products are obtained.

As explained above, the external layer or coating consists of processed cheese for which the creaming properties are desired; it is also possible, but not obligatory, to incorporate, into the processed cheese formula, egg proteins or serum proteins; these proteins make it possible to obtain a nonreversible gel upon heating and facilitate the role of the coating as a shell stably maintaining the core.

The addition of components of this type is desired in particular for products to be consumed after heating; indeed, they will coagulate under the effect of the temperature while allowing the shape of the product to be maintained.

In this case, the heating temperatures are advantageously less than the coagulation temperature of these proteins, so that they do not coagulate at the time the product is heated (heating on a water bath or in an oven).

Of course, the processed cheese constituting the coating may also be flavored or enriched with formed elements.

The filling or core consists either of processed cheese, identical to or different from the shell in nature, or of curd or fromage frais, or of any other food product which is advantageously provided in the form of puree and having a viscosity and a pH compatible with the processed cheese constituting the external shell, as described above.

Of course, the product constituting the core may be flavored and/or caused to acquire overrun.

The amount by weight of the constituent of the core relative to the finished product is between 10 and 50%, 10% representing the threshold for obtaining a mouth feel and 50% the threshold above which the process can no longer be carried out.

The external shell therefore constitutes from 50 to 90% by weight relative to the total weight of the finished product.

The products obtained are packaged in any type of packaging well known to persons skilled in the art; preferably, they are packaged directly in aluminum shells, in "bi-shells" or dishes which can be fitted with lids, for example made of plastic or other suitable material.

FIG. 3A represents an embodiment in which a cheese portion 11 formed of constituents 12 and 13 forming the external shell and the internal filling, respectively, are sent, by means of a metering tube 14, into an aluminum receptacle 15 in the same manner as that described with respect to FIG. 1, the constituent 12 being cast into the receptacle 15 until a layer of paste is obtained at the bottom of the receptacle whose thickness corresponds to that of the desired shell, and then while the flow of the constituent 12 is maintained, the constituent of the internal paste 13 takes its place in the receptacle for a time corresponding to the quantity of filling desired, the process being followed by the casting of a layer of external constituent 12.

This embodiment makes it possible to produce products of variable shape, in particular of cylindrical shape (3B), having the shape of a triangular portion (3C) and having a parallelepipedic shape with a square section (3D), comprising an external shell of processed cheese and an internal filling completely enclosed in the external shell.

Figure 4A:
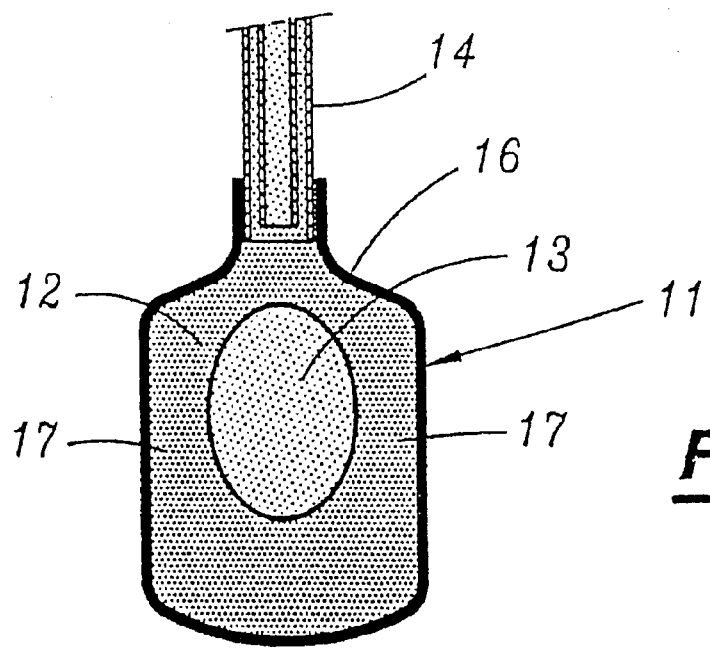
FIG. 4A is a longitudinal sectional view of the tubes for metering a cheese portion and of the latter received in its final packaging in the form of a composite shell (or bi-shell) at the end of casting.

FIG. 4A represents an embodiment in which the cheese portion 11 formed of the constituents 12 and 13 forming the external shell and the internal filling, respectively, are sent by means of a metering tube 14 into a receptacle 16. The latter is formed as known per se of two identical half-shells arranged symmetrically. They are assembled to each other along a peripheral external rim 18 so as to delimit a closed space in which the cheese portion is confined.

Each half-shell 17 is formed of a polymer film formed into a hollow shape in particular by blowing into a mold of appropriate shape. The hollow thus defined is bordered by the flat peripheral rim 18 intended for the assembly of the two half-shells.

Figure 4B:
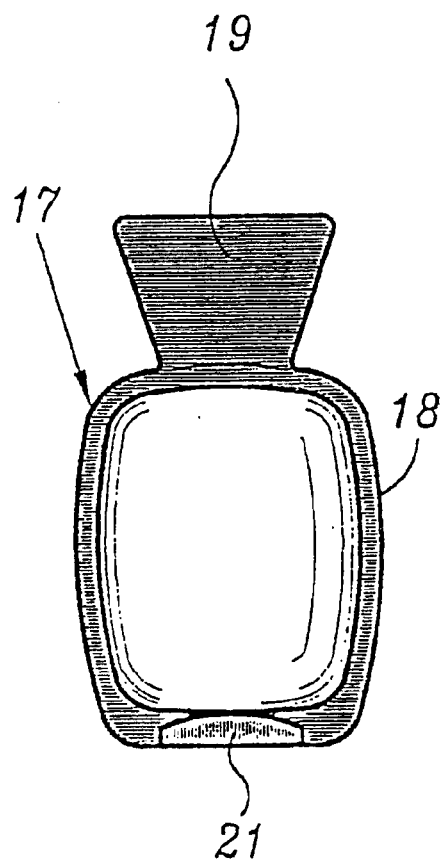
FIG. 4B represents a front view of the cheese portion in its packaging in the form of a bi-shell.

In FIG. 4B, the packaging has a rectangular shape.

In this figure, the half-shells have a longitudinal axis.

Along this axis, the peripheral rim 18 of each half-shell is extended on one side by a tab or ear 19 forming a gripping means. On the opposite side, the rim 18 of each half-shell has a flat extension 21. These extensions are intended to be integrally attached to each other, in particular by heat-sealing after filling the shell. They thus constitute the zone for the terminal sealing of the two half-shells.

To produce the cheese paste thus packaged, the external shell forming the packaging is first produced by assembling two half-shells along their peripheral rim. The two half-shells are integrally attached to each other predominantly along the length of this rim by heat-sealing.

As represented in FIG. 4A, the two half-shells are left separated between the two extensions 21. The gap in the shell delimited defines a passage for introducing the metering tubes 14. The constituent of the external shell 12 and of the internal filling 13 are cast into the shell 16 in a manner similar to that described with regard to FIGS. 2A to 2D.

When the casting is complete, the metering tube 14 is extracted and the two extensions 21 are applied and sealed firmly to each other. To this effect, they are for example pressed between two heating jaws in order to bring about attachment by heat-sealing.

After this operation, the shell 16 is then hermetically sealed, ensuring the isolation of the cheese portion from the external environment.

To consume the cheese portion thus packaged, the consumer grips one ear 19 in each hand. By pulling on them, they pull apart the two half-shells which move around a hinge formed by the two extensions 21, exposing the cheese portion.

FIG. 5A represents an embodiment in which the cheese portion 11, formed of the constituents 12 and 13 forming the external shell and the internal filling, respectively, are sent by means of a metering tube 14 into a heat-formed dish 22 according to the process described in relation to FIG. 1.

As represented in FIG. 5C, the heat-formed dish 22 comprises a flat peripheral rim 23, extending from one side in a tab 24 forming a gripping means.

The constituent of the external shell 12 and of the internal filling 13 is cast into the dish 22 in a manner similar to that described with regard to FIGS. 2A to 2D.

After filling the dish 22 and withdrawing the metering tubes 14, a lid 25 corresponding in shape and size to that of the dish and of the flat peripheral rim 23 is applied to the rim 23 and heat-sealed thereto, as represented in FIG. 5B.

To consume the cheese portion thus packaged, the consumer grips the tab 24 and by pulling on the lid 25, it is detached from the rim 23, exposing the cheese portion, as represented in FIG. 5C.

As a variant, the products may also be co-metered in the hot state into an intermediate mold where the gelling step will take place during the cooling, and then after cooling, they are unmolded and coated either with an edible coating based on lipids, proteins or polysaccharides, or with a food wax, before being packaged in the final packaging.

Moreover, the products can have any shape and have a weight of between 5 and 200 g, preferably 5 to 50 g.

The invention will be illustrated with the aid of the examples below given by way of illustration and without limitation.

EXAMPLE 1
Filled Patty for Nibbling After a Meal
Formulation of the Constituent of the External Shell:

| | |
|---|---|
| emmenthal | 15% |
| cheddar | 20% |
| butter | 10.5% |
| creamed milk | 3% |
| milk protein | 4% |
| reuse (preprocessing) | 5% |
| emulsifying salts | 1.5% |
| NaCl | 0.6% |
| gelatin | 2% |
| carrageenans | 0.5% |
| orange-colored coloring | 0.003% |
| water | 44.8% |

All the ingredients are mixed and heated, under intense shearing, at 110° C.

The product is cooled to 90° C. and transferred into one of the two metering vessels of the machine.

This product will serve as external paste. It has a dry extract of 41%, a fat/dry extract ratio of 48% and a pH of 5.50.

Formulation of the Filling:

The internal paste is manufactured simultaneously and in parallel with the external paste.

| | |
|---|---|
| Brie | 30% |
| cheddar | 19% |
| cheese | 14% |
| butter | 12.5% |
| fresh curd | 10% |
| whey proteins | 3% |
| emulsifying salts | 0.8% |
| NaCl | 0.6% |
| reuse (preprocessing) | 5% |
| water | 24.1% |

Process of Preparation:

All the ingredients are mixed and heated, under moderate shearing, at 100° C.

The product is cooled to 90° C. and transferred into the second metering vessel of the machine. This product, used as filling, has a dry extract of 42%, a fat/dry extract ratio of 56% and a pH of 5.6.

The two pastes are simultaneously metered and introduced into the packaging according to the "one-shot" process. The finished product is a 20 g patty packaged in a bi-shell type shell made of plastic and hermetically closed, and then cooled.

The external paste is firm, is orange-colored and the filling melts in the mouth, is cream-colored and has the typical Brie taste.

A contrast in color, texture and taste is obtained between the two pastes.

EXAMPLE 2
Filled Product for Culinary Use
Formulation of the Constituent of the External Shell:

| | |
|---|---|
| emmenthal | 23% |
| cheddar | 24% |
| butter | 8% |
| caseine | 3% |
| egg white powder | 4% |
| emulsifying salts | 1.5% |
| NaCl | 0.6% |
| carrageenans | 0.9% |
| water | 35% |

All the ingredients, except the egg white powder, are mixed and heated, under relatively intense shearing, at 100%.

The product is cooled to 60° C. and the egg white powder is then incorporated into the product under moderate stirring. The whole is transferred into one of the two metering vessels of an installation as illustrated in FIG. 1.

The post-incorporation of the egg white at 60° C. makes it possible to avoid the proteins coagulating during the cooking operation. A product is thus obtained which is elastic, malleable and completely suitable for use as external paste. It has a dry extract of 45%, a fat/dry extract ratio of 45% and a pH of 5.40.

Formulation of the Filling:

The internal paste used for the filling is manufactured simultaneously and in parallel with the external paste used for the external shell.

| | |
|---|---|
| blue-veined cheese | 12% |
| other cheeses (gouda, cheddar) | 10% |
| butter | 18% |
| powdered whey | 2.7% |
| skimmed milk | 6% |
| caseine | 4.5% |
| emulsifying salts | 2% |
| NaCl | 0.5% |
| reuse (preprocessing) | 5% |
| water | 44.3% |

Process of Preparation:

The ingredients are mixed and heated under intense shearing at 110° C.

The product is cooled to 60° C. and transferred into the second metering vessel of the installation. This product, used as filling, has a dry extract of 43%, a fat/dry extract ratio of 51.5% and a pH of 5.6.

The two pastes are simultaneously metered according to the "one-shot" process.

The finished product weighs 50 g. It is packaged in an aluminum tub, which is hermetically sealed.

The expressions "reuse" or "preprocessing" are understood to mean a processed cheese gelled by creaming, derived from a previously processed cheese of the same composition and which will serve as seed for the formation of the protein network. Traditionally in the manufacture of processed cheese, this compound is added at the rate of 3 to 6% of the formula.

What is claimed is:

1. A process for the manufacture of a cheese-based product of the type comprising an external shell and an internal filling which is completely enclosed in the external shell, wherein at least said external shell is obtained from a processed cheese having creaming capacity, wherein said cheese-based product is obtained by co-metering of the constituents forming respectively the external shell and the filling in the hot state at a temperature higher than the gelling temperature of the processed cheese paste constituting the external shell, and said constituents are simultaneously introduced into an intermediate mold or a final packaging and said constituents are cooled to a temperature of less than the gelling temperature of the processed cheese paste constituting the external shell.

2. The process of claim 1, wherein the co-metering and the simultaneous introduction of the constituents into the mold or the packaging are carried out at a temperature greater than the gelling temperature of the processed cheese constituting the external shell.

3. The process of claim 1, wherein the co-metering and the simultaneous introduction into the mold or the packaging of the constituents are carried out at a temperature of between 50 and 90° C.

4. The process of claim 1, wherein viscosties of said constituents during the co-metering and the simultaneous introduction into the mold or the packaging are between 5 and 50 poises (0.5 to 5 Pa·s), for a shearing rate of 150 $s^{-1}$ at 80° C.

5. The process of claim 1, wherein the cooling temperature is less than 50° C.

6. The process of claim 1, wherein at the time of the co-metering and the introduction into the mold or the packaging, said constituents have a difference in pH not greater than 0.5.

7. The process of claim 1, wherein at the time of co-metering and the introduction into the mold or the packaging, said constituents have a difference in dry extract not greater than 5%.

* * * * *